Figure 1:
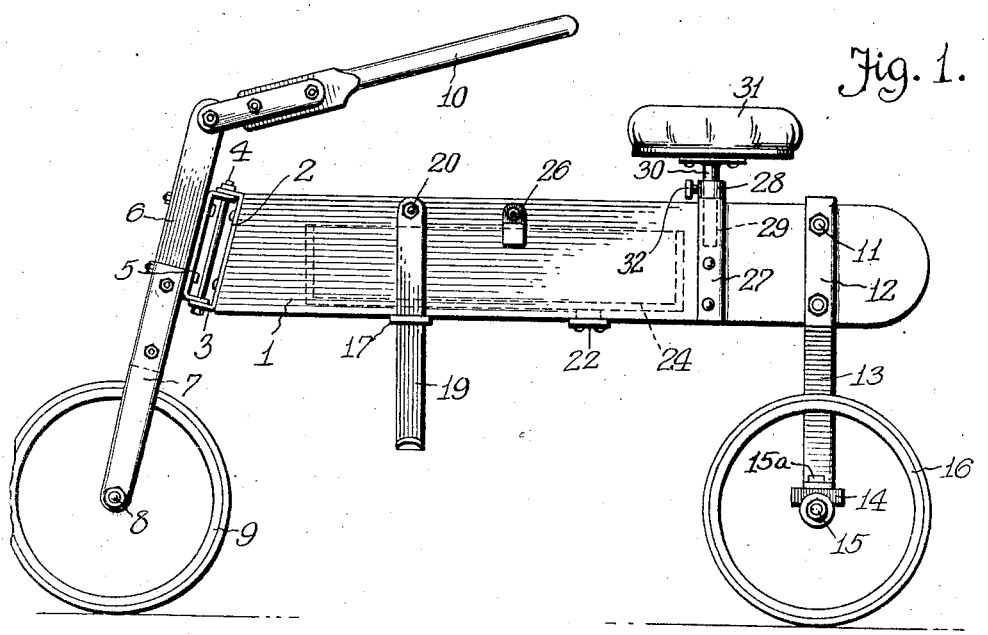

L. P. HOLT & C. H. WHITING.
MANUALLY PROPELLED VEHICLE.
APPLICATION FILED MAY 20, 1918.

1,288,588.

Patented Dec. 24, 1918.

Inventor
Luther P. Holt,
Chauncey H. Whiting,

UNITED STATES PATENT OFFICE.

LUTHER P. HOLT AND CHAUNCEY H. WHITING, OF PORT HURON, MICHIGAN.

MANUALLY-PROPELLED VEHICLE.

1,288,588.  Specification of Letters Patent.  Patented Dec. 24, 1918.

Application filed May 20, 1918. Serial No. 235,673.

*To all whom it may concern:*

Be it known that we, LUTHER P. HOLT and CHAUNCEY H. WHITING, citizens of the United States of America, residing at Port Huron, in the county of St. Clair, State of Michigan, have invented certain new and useful Improvements in Manually-Propelled Vehicles, of which the following is a specification, reference being had therein to the accompanying drawings.

This invention relates to a manually propelled vehicle and our invention aims to provide a three-wheel vehicle or movable support that may be advantageously used by cripples, particularly a person having only the use of one limb and one hand, for moving about or traveling on streets and pavements, with greater facility than an ordinary invalid chair, which might necessitate an attendant.

Our invention further aims to provide a vehicle of the above type that has parts thereof reversible, so that the vehicle may be propelled by either the right or left limb and the body comfortably supported during the manual propulsion of the vehicle.

Our invention further aims to provide a wheeled structure that may be made of various sizes so that it may be used for various purposes. For instance, either as a toy for juveniles or as a carrier for delivery purposes.

Our invention will be hereinafter specifically described and then claimed, and reference will now be had to the drawing, wherein—

Figure 2:
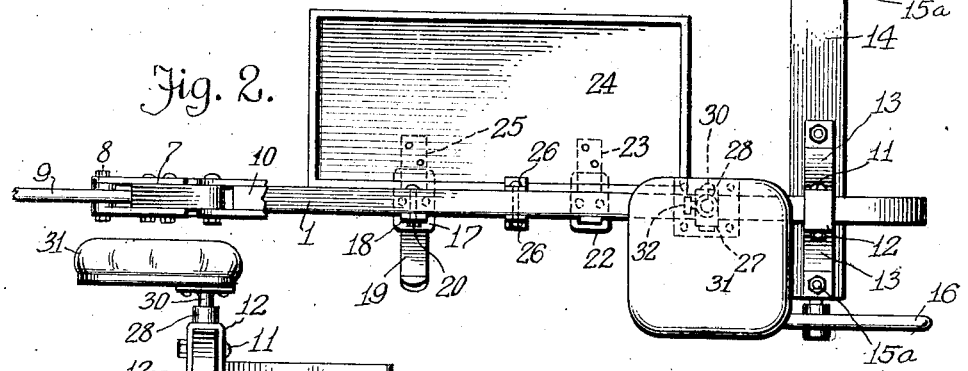
Figure 3:
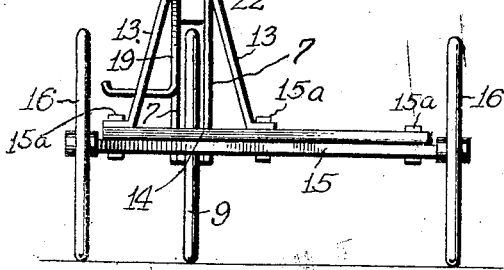
Figure 4:
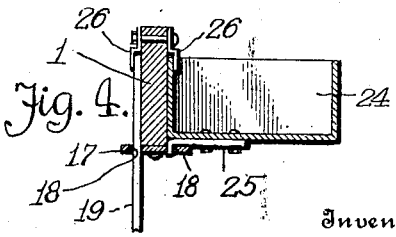

Figure 1 is a side elevation of the vehicle;
Fig. 2 is a plan of the same;
Fig. 3 is a view of the rear end of the vehicle, and
Fig. 4 is a cross sectional view of the same showing a reversible carrier.

The vehicle comprises a longitudinally disposed center board or support having the forward end thereof beveled, as at 2, to support an inclined bracket 3 to which is connected, by a king bolt 4, a bracket 5 carried by a steering post 6. The steering post 6 has the lower end thereof bifurcated or provided with side arms 7 having the lower ends thereof supported by the axle 8 of a wheel 9. The upper end of the steering post 6 has a pivoted tiller handle 10 that may extend rearwardly so that a person on the center board or support 1 may steer the vehicle or by swinging the handle forward, over the top of the steering post, it may be used for pulling the vehicle.

Fitted on the rear end of the center board or support 1 and connected thereto, as at 11, is a strap or yoke 12 having diverging legs 13 with the lower ends thereof detachably connected to a bolster 14. The same fastening means 15ª employed for connecting the legs 13 to the bolster 14 also connects said bolster to a rear axle 15 having revoluble wheels 16 on the ends thereof. By reference to Fig. 3 it will be seen that the legs 13 are supported at one end of the bolster 14 and such arrangement permits of the right limb being used to propel the vehicle, but by transferring the legs 13, to the opposite end of the bolster 14, the left limb may be conveniently used. It is therefore obvious that the center board or support 1 can be positioned to sustain a body while either limb is used.

Suitably connected to the lower edge of the center board or support 1, contiguous to the forward end thereof is a horizontally disposed bracket or plate 17 which has the ends thereof protruding from the sides of the center board and provided with slots 18. Extending through one of the slots 18 is a limb rest 19, which has the upper end thereof detachably connected, as at 20 to the side of the center board 1, said connection permitting of the limb rest being removed and transferred to the opposite side of the center board 1.

The lower edge of the center board, has another bracket or plate 22 that is also slotted or apertured and adapted to receive an arm 23 carried by the bottom of a receptacle or carrier 24, the arm 23 being at one end of the receptacle so that the opposite end thereof may rest upon the protruding end of the bracket or plate 17 and be provided with an arm 25 that will coöperate with the arm 23 in supporting the receptacle or carrier. To retain the receptacle against the side of the center board, said center board has a pivoted clip 26 that may be swung downwardly against the inner wall of the receptacle to coöperate with the arms 23 and 25 and the brackets 17 and 22 in supporting the receptacle or carrier in a horizontal position.

Fitted on the upper edge of the center board or support 1 is a strap or yoke 27 having a central socket 28 communicating with an opening 29 in the upper edge of the center board 1. The socket 28 and the opening 29 are adapted to receive the post or pedestal 30 of a seat 31, said seat post being held by a set screw 32 which permits of the seat being raised and lowered and swung to either side of the center board 1. As clearly shown in Fig. 2 the post or pedestal 30 is at one edge of the seat 31 so that said seat may overhang either side of the center board or support, it being preferable that the seat occupy that side opposite the receptacle or carrier 24.

From the foregoing, it will be observed that the limb rest 19, receptacle 24 and seat 31 are reversible relative to the center board 1, and that the bolster 14 may be shifted relative to the rear end of the center board 1 so as to be properly offset and provide clearance for a person having either a left or right limb. The limb rest 19 will support any portion of an amputated limb that may remain or may serve as a foot rest for an additional passenger seated on the forward end of the center board.

While the vehicle has been primarily designed for crippled adults and juveniles, yet it is possible to embody the construction as a toy or small sized machine so that the same may be used by children, delivery or newsboys.

One embodiment of our invention has been illustrated, but it is to be understood that the structural elements are susceptible to such changes as fall within the scope of the appended claims.

What we claim is:

1. A manually propelled vehicle comprising a center board, a pivoted steering post at the forward end thereof, a wheel supporting said post, an offset axle supporting the rear end of said center board, wheels on the ends of said axle, an adjustable seat on said center board.

2. A vehicle of the type described, comprising a center board, a steering post at the forward end thereof, a wheel supporting said post, an axle supporting the rear end of said center board and capable of being offset relative to either side thereof, wheels on the ends of said axle, a receptacle, and means carried by said center board adapted for supporting said receptacle at either side thereof.

3. A vehicle of the type described, comprising a center board, a steering post at the forward end thereof, a wheel supporting said post, an axle supporting the rear end of said center board and capable of being offset relative to either side thereof, wheels on the ends of said axle, a receptacle, means carried by said center board adapted for supporting said receptacle at either side thereof, a limb rest associated with said means and detachably connected to said center board, and a seat supported from said center board and capable of being swung to either side thereof.

4. A vehicle of the type described, comprising a center board, wheels supporting the ends thereof with one of said wheels arranged to be steered, brackets on the lower edge of said center board and having the ends thereof protruding from the sides of said center board, a receptacle adapted to engage the ends of said brackets at either side of said center board, means carried by said center board and adapted to coöperate with said brackets in retaining said receptacle in engagement with said center board and an adjustable seat on said center board adapted to project from that side of said center board opposite said receptacle.

5. A vehicle of the type described comprising a center board, a pivoted steering post at the forward end thereof, a wheel at the lower end of said post, a pivoted tiller handle at the opposite end of said post and capable of being swung over said post, an axle supporting the rear end of said center board and capable of being offset relative to either side of said center board, wheels on the ends of said axle, an adjustable seat on said center board adapted to be swung to either side thereof, a detachable receptacle on one side of said center board, and a detachable limb rest on the opposite side thereof.

In testimony whereof we affix our signatures in presence of two witnesses.

LUTHER P. HOLT.
CHAUNCEY H. WHITING.

Witnesses:
KARL H. BUTLER,
ANNA M. DORR.